United States Patent [19]

Tsukada

[11] Patent Number: 5,080,498
[45] Date of Patent: Jan. 14, 1992

[54] DUST SEAL DEVICE OF LINEAR GUIDE APPARATUS

[75] Inventor: Toru Tsukada, Maebashi, Japan

[73] Assignee: Nippon Seiko Kabushiki Kaisha, Japan

[21] Appl. No.: 713,818

[22] Filed: Jun. 12, 1991

[30] Foreign Application Priority Data

Jun. 12, 1990 [JP] Japan .................... 2-61970[U]

[51] Int. Cl.[5] .................... F16C 29/06; F16C 33/72
[52] U.S. Cl. ........................................ 384/15; 384/45
[58] Field of Search .................... 384/15, 16, 43–45

[56] References Cited

U.S. PATENT DOCUMENTS

| | | | |
|---|---|---|---|
| 2,951,728 | 9/1960 | Drake | 384/15 |
| 4,273,389 | 6/1981 | Takai | 384/45 |
| 4,850,720 | 7/1989 | Osawa | 384/15 X |
| 4,921,358 | 5/1990 | Kasuga et al. | 384/15 |

Primary Examiner—Thomas R. Hannon
Attorney, Agent, or Firm—Basile and Hanlon

[57] ABSTRACT

A dust seal device used with a linear guide apparatus includes a pair of side seals respectively fixed to front and rear end surface of end caps and a pair of under seals respectively removably attached to lower surfaces of side walls of a slider. Each side seal has an inverted U-shape with a pair of bent pieces formed by bending lower portions of both leg portions of each side seal inwardly at right angles in an axial direction so as to cover the lower end surfaces of one end cap. Each side seal also has projections formed by respectively bending lateral side portions of the pair of bent pieces further upwardly to constitute positioning and under seal fall-off preventing projections. Each under seal is of a rectangular strip shape having a length substantially equal to that of the slider, including the thickness of the end caps. Each under seal is attached to the slider by inserting each under seal between the bent piece and the lower end surface of the end cap. The lateral movement of the under seal is prevented by the positioning and under seal fall-off preventing projections.

2 Claims, 4 Drawing Sheets

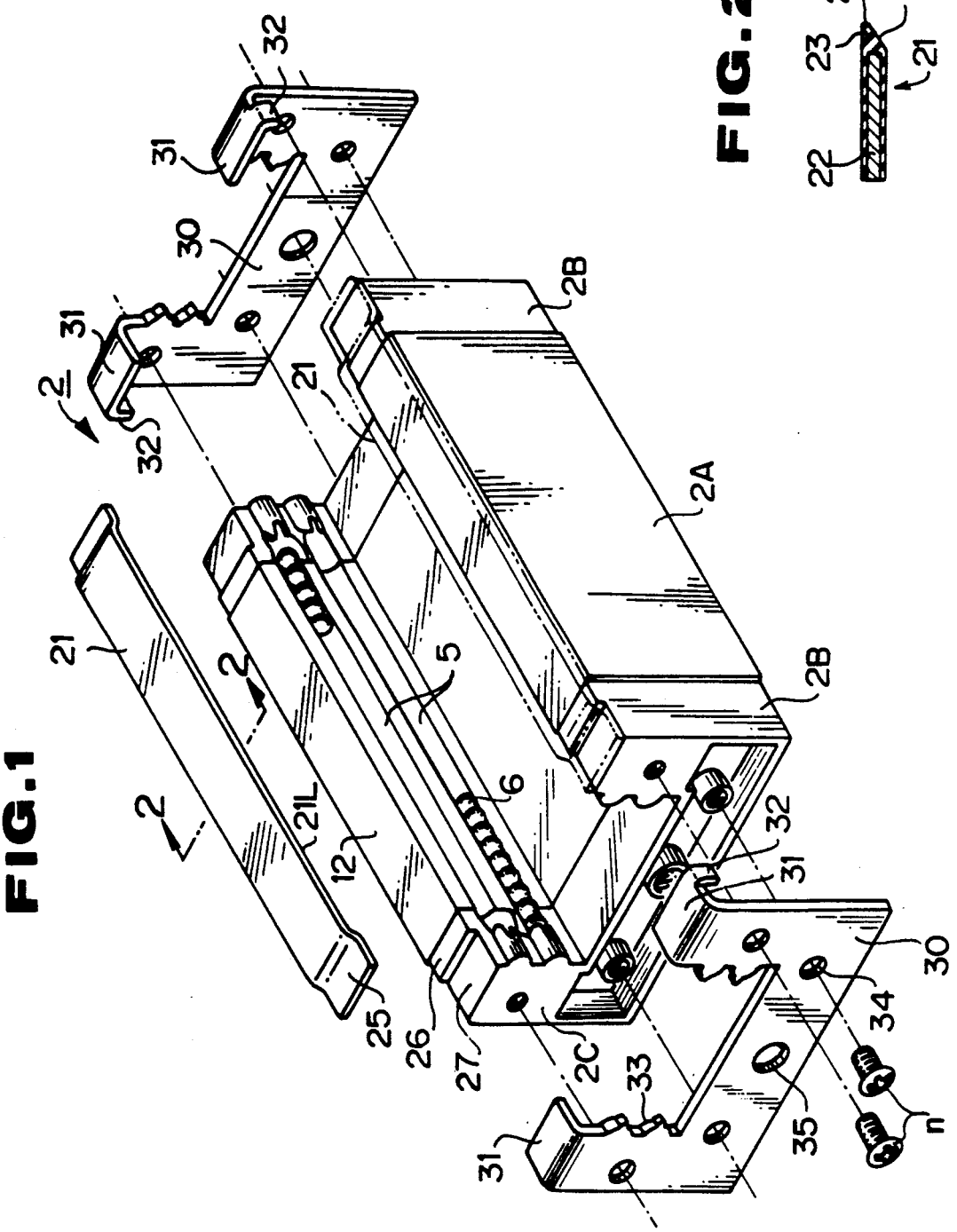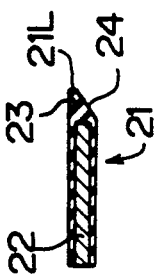

DUST SEAL DEVICE OF LINEAR GUIDE APPARATUS

BACKGROUND OF THE INVENTION

1. Field of the Invention

The present invention relates to a dust seal device for a linear guide apparatus used in a machine tool, an industrial machine, and the like, and, in particular, to an improvement in an attaching structure of the under seals of the dust seal device.

2. Description of the Prior Art

With reference to FIG. 3, a prior art linear guide apparatus generally includes an axially extended, elongated guide rail 1 and a slider 2 having a substantially inverted U-shaped cross section and movably straddling the guide rail 1. The guide rail 1 has ball rolling grooves 3 formed in both side surfaces. A main body 2A of the slider 2 has ball rolling grooves 5 formed in the inner surfaces of both side walls 4 so that the ball rolling grooves 5 respectively oppose the ball rolling grooves 3 of the guide rail 1 as shown in FIG. 4. A plurality of balls 6 are loaded in the opposed ball rolling grooves 3 and 5. The slider 2 is movable in an axial direction through rolling of the balls 6. With the movement of the slider 2, the balls 6 interposed between the guide rail 1 and the slider 2 are moved while rolling to an end of the slider main body 2A. In order to continuously move the slider 2 in the axial direction, it is necessary to circulate the balls 6. Accordingly, a through bore 7 is formed in each of the side walls 4 of the main body 2A as a ball return passage and, at the same time, end caps 2B having a substantially inverted U-shaped cross section are attached to opposite ends of the main body 2A. A pair of U-shaped curved paths 8 are formed in each of the end caps 2B, respectively, to bring the ball rolling grooves 3 and 5 in communication with the ball return passage 7. As a result, an endless ball circulating path is formed by the ball rolling grooves 3 and 5, the curved paths 8, and the ball return passages 7.

When foreign matter, such as dust, chips, cuttings, and the like, intrude into a gap between the guide rail 1 and the slider 2 straddling the guide rail 1 and are deposited on the ball rolling grooves 3 and 5 and the like, the smooth movement of the balls 6 is disturbed. Accordingly, a side seal 10 is usually attached by small screws n to an outer end surface 2c of each end cap 8 to prevent the foreign matter from intruding from opposite end portions of the slider 2. At the same time, under seals 11, FIG. 5, are attached to the lower surfaces of the slider 2 to seal gaps between the side surfaces 1b of the guide rail 1 and the lower surfaces of the slider 2 to thereby prevent foreign matter from entering through the lower gaps.

FIG. 5 shows an example of a prior art structure for attaching the under seals 11. Each under seal 11 is an elastic sheet of a rectangular strip shape. Each under seal 11 has a length substantially equal to the length of the slider main body 2A and a width a little larger than the width of the lower end surface 12 of the slider main body 2A. Three fixing bores 13 are formed in the under seal 11 at spaced intervals in an axial direction. On the other hand, rivet bores 14 corresponding to the fixing bores 13 are formed in each lower end surface 12 of the slider main body 2A. The under seal 11 is applied to the end surface 12 of the slider main body 2A and fixed by inserting rivets 15 through the fixing bores 13 and into the rivet bores 14. Each lower end surface 16 of the end cap 2B is flat. An inner edge 17 of the fixed under seal 11 is slidably in contact with the side surface 1b of the guide rail 1 to achieve the sealing of the lower side of the slider 2.

However, in such a prior art dust seal device, or a dust seal structure of the under seals of a linear guide apparatus, since the under seals are fixed by riveting, the following problems are encountered:

A process for forming the rivet bores 14 in the lower end surface 12 of the slider main body 2A is required. Thus, the number of working processes is increased.

At the time of fixing the under seals 11, labor for inserting the rivets 15 is needed. Such labor is hand work such that the manufacturing efficiency is very low. Thus, the number of assembling processes increases.

Since rivets are used, there is a concern for the reliability in securing the under seals 11.

Since the length of the under seal 11 is made equal to that of the slider main body 2A and the areas of the lower surfaces of the end caps 2B are not covered by the under seal 11, sealing is incomplete.

In contrast, another prior art structure was proposed as shown in FIG. 6. In this structure, each under seal 11 is mounted by fitting opposite ends of the under seal 11 respectively into slittings 18 formed in lower portions of the end caps 2B. In this structure, rivets are not used and the mounting of the under seal 11 is easy. However, since the end caps 2B are injection mold products of a synthetic resin, the strength of the slittings 18 for fixing the under seal 11 is weak and there is a concern for the safe operation of the apparatus. Furthermore, since the slitting 18 cannot be formed to extend completely to an axial outer end of each end cap 2B, the sealing of opposite end portions of the under seal 11 is incomplete.

SUMMARY OF THE INVENTION

The present invention was made in view of the problems in the prior art and it is an object of the invention to provide a dust seal structure for a linear guide apparatus which is of a fitting-into type without using rivets and which involves no unsealed portions.

A dust seal structure of the present invention is used with a linear guide apparatus. The linear guide apparatus includes an elongated guide rail extending in an axial direction and having ball rolling grooves formed in both side surfaces thereof. A slider movably straddles the guide rail. The slider includes a slider main body having ball rolling grooves which are respectively formed in inner surfaces of side walls thereof and respectively oppose the ball rolling grooves of the guide rail. The slider main body further has ball return passages penetrating through thick wall portions of the side walls in parallel with the ball rolling grooves in the inner surfaces of the side walls. End caps are respectively joined to opposite ends of the slider main body. Each of the end caps has a pair of curved paths for bringing the ball return passages into communication with the ball rolling grooves. A plurality of balls are rollably inserted into the ball rolling grooves.

The dust seal structure includes a pair of side seals respectively attached to opposite end surfaces of the end caps for sealing openings at lower portions of gaps between the slider and the guide rail. The dust seal structure also includes under seals, each of which has a rectangular strip shape of substantially equal length to that of the slider. Each side seal has a pair of bent pieces formed by bending lower portions of two leg portions of each side seal inwardly in an axial direction to cover the lower end portions of the end cap and to sandwich one end portion of the pair of under seals between the pair of bent pieces and the lower end portions of the end cap. The pair of bent pieces of each side seal has respectively positioning and under seal fall-off preventing projections formed by bending both lateral outer side portions of the pair of bent pieces upwardly. Each of the pair of under seals is mounted on the slider by inserting its opposite end portions respectively between the lower end surfaces of the end caps and the bent pieces of the side seals.

Each end cap may be formed with a pair of cutout step portions formed in the lower end surfaces of the side walls. The step surfaces may be formed by bending opposite end portions of each of the pair of under seals so that each of the cutout step portions engages a corresponding one of the step surfaces of the end caps.

As described above, each of the pair of under seals is mounted on the slider by inserting each of the opposite end portions of the under seal into a gap between the lower end surface of the end cap and the bent piece of one of the side seals. As a result, riveting work as in the prior art is not necessary and it is possible to attach the under seals simply and quickly. Furthermore, since there is no need to form slittings in the end caps, the strength of the end caps is not reduced and safety is insured. Moreover, since the under seals can be formed to extend over the whole length of the slider, complete sealing can be achieved by covering the opposite end portions of the slider.

BRIEF DESCRIPTION OF THE DRAWINGS

FIG. 1 is an exploded perspective view of a slider with a dust seal device of an embodiment of the present invention as viewed from the under side of the slider;

FIG. 2 is a cross sectional view generally taken along line 2—2 in FIG. 1;

DESCRIPTION OF THE PREFERRED EMBODIMENT

Figure 3:
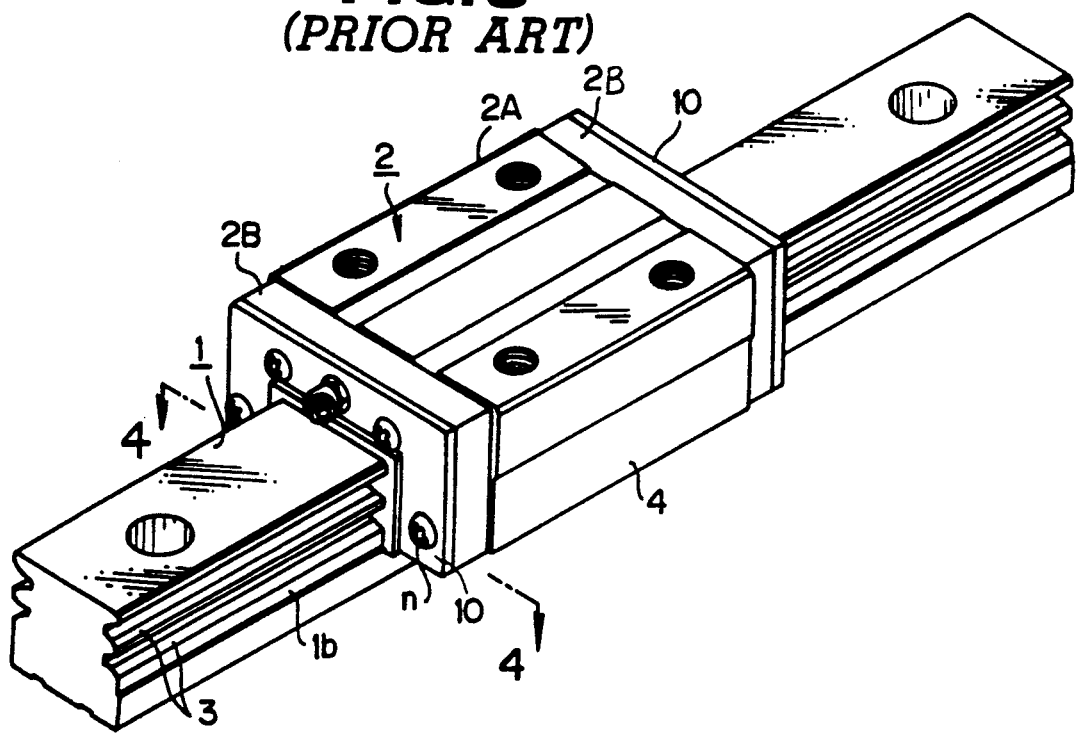
FIG. 3 is a perspective view of a prior art linear guide apparatus.
Figure 4:
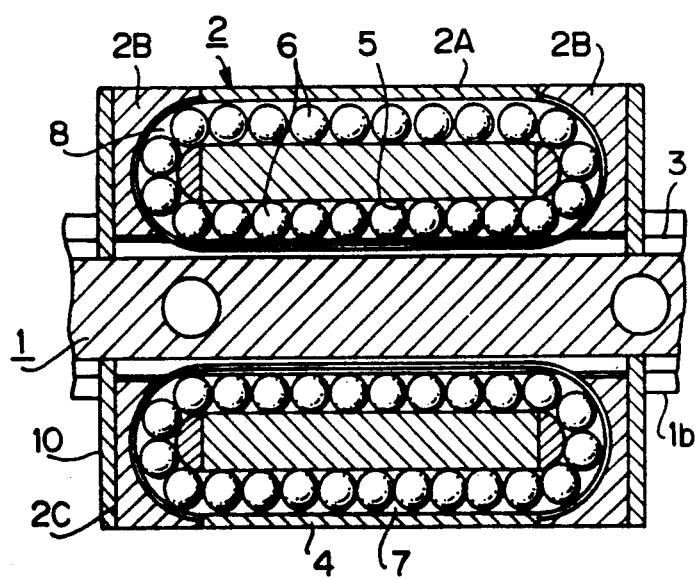
FIG. 4 is a cross sectional view generally taken long line 4—4 in FIG. 3.
Figure 5:
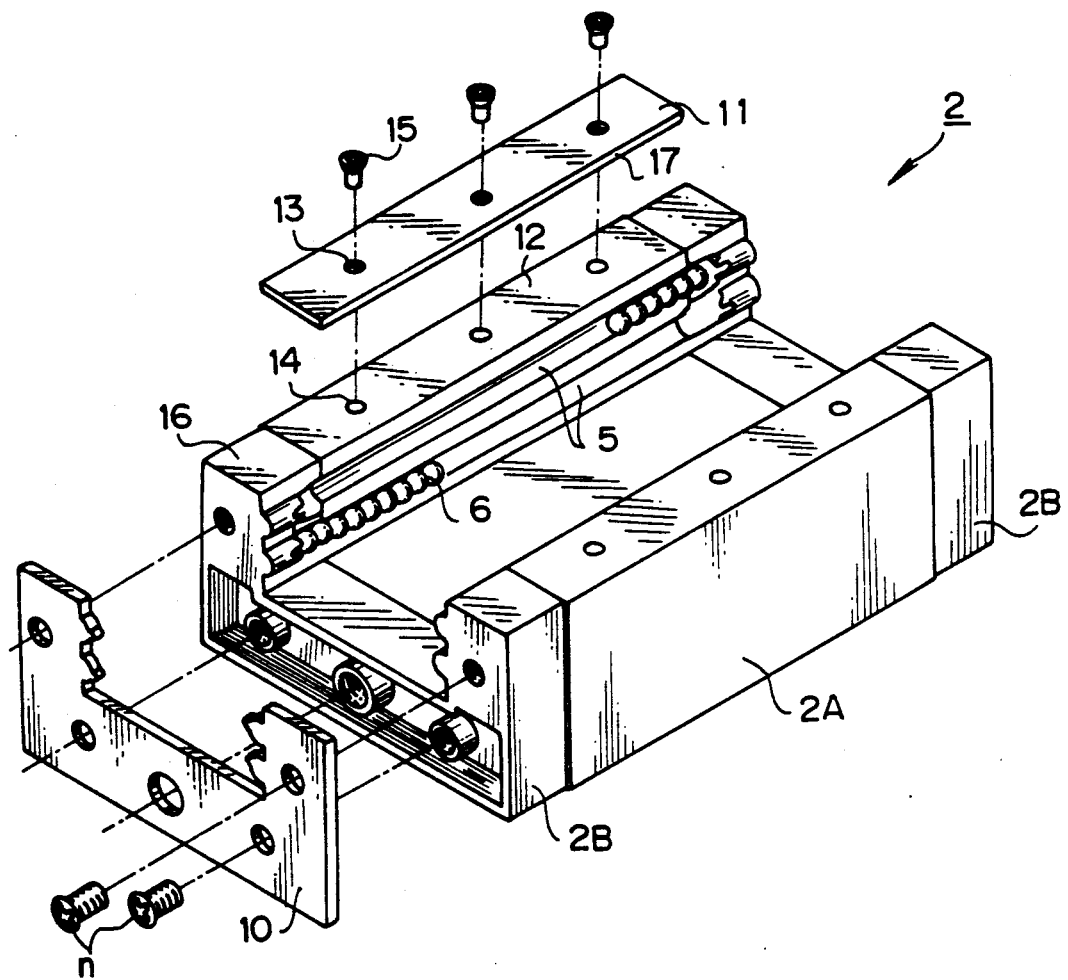
FIGS. 5 and 6 are disassembled perspective views of two prior art dust seal structures.
Figure 6:
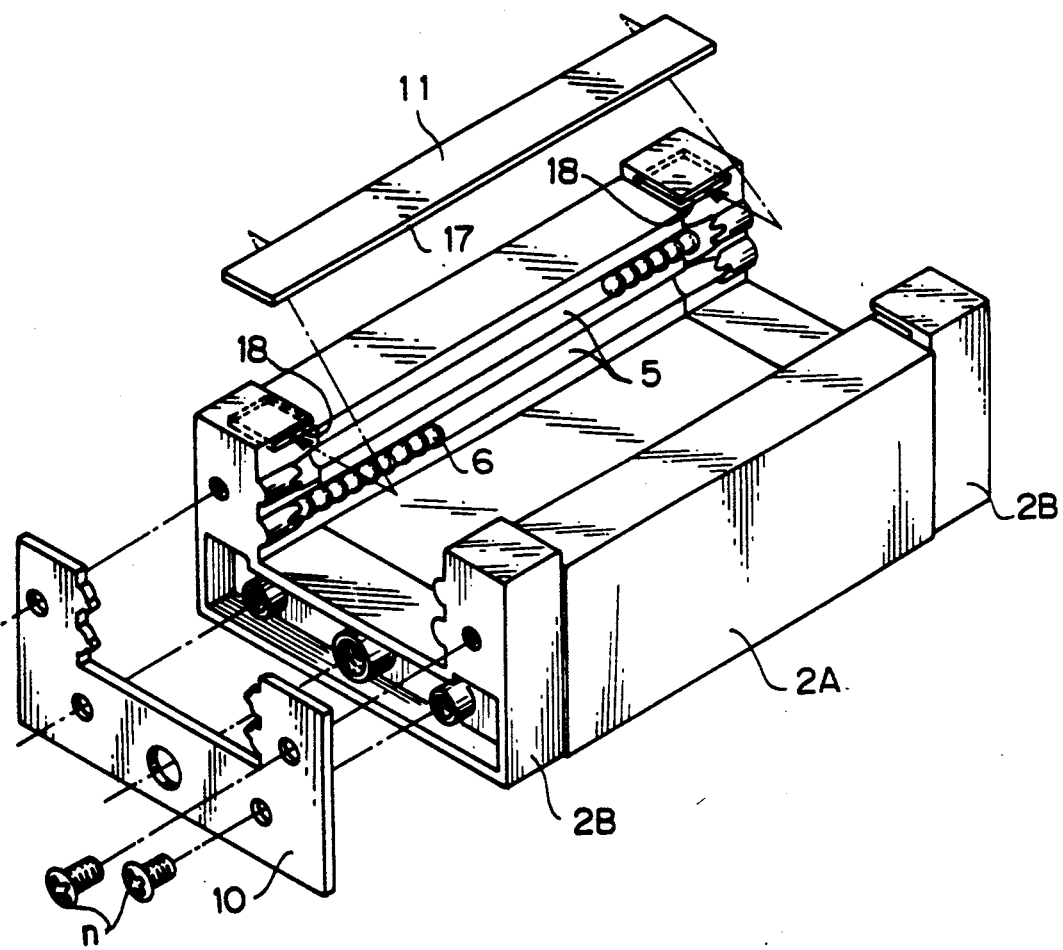

An embodiment of the invention will be described with reference to the drawings in which like or equivalent parts to that in the prior art are designated with like numerals throughout the drawings. FIG. 1 shows an embodiment of the invention as viewed from the under side of a slider 2 with only a portion of the balls 6 being shown. Each of a pair of under seals 21 includes, as shown in FIG. 2, a mandrel 22 made of a steel plate. An outer coating 23 made of a synthetic rubber is wrapped around and welded to the mandrel 22. The under seal 21 is of a rectangular strip shape and has a length substantially equal to that of the slider 2 including enc caps 2B. Each under seal 21 has an inner edge which is tapered to form a slant surface 24. A lip portion 21L of an extreme edge of the under seal 21 is adapted to slidably contact a side surface 1b of a guide rail 1. Furthermore, each end of the under seal 21 is formed with a step surface 25 which is formed by bending the end portion of the under seal 21 first upwardly (in FIG. 2, downwardly) and then horizontally in two steps so that a stepped difference is formed which is substantially equal to a plate thickness of the under seal 21.

On the other hand, each end cap 2B is a die casting product made of stainless steel or aluminum and having a higher strength than that of a synthetic resin. The end cap 2B has cutout step portions 27 respectively formed in lower end surfaces 26 of both side walls of the end cap 2B. The step surfaces 25 of each of the pair of under seals 21 are engaged with the cutout step portions 27 of the two end caps 2B.

A pair of side seals 30 are respectively attached to the outer end surfaces of the end caps 2B. Each of the side seals 30 is made of a steel plate having an inverted U-shape. A synthetic rubber is welded to the steel plate. A pair of bent pieces 31 are provided at lower end portions of both leg portions of the side seal 30. The bent pieces 31 are formed by bending the lower end portions of both the leg portions axially inwardly or toward the bottom surfaces of the side walls of the end cap 2B at substantially right angles so that each of the step surfaces 25 of the under seal 21 is sandwiched between the step portion 27 of the end cap 2B and the bent piece 31 of the side seal 30.

Furthermore, each bent piece 31 includes a positioning and under seal fall-off preventing projection 32 which is formed by bending an ear-shaped protruding piece protruding from a lateral side of the bent piece 31 upwardly (in FIG. 1, downwardly) at right angles.

The side seal 30 has protrusions 33 made of rubber and formed in inner edges of both leg portions of the side seal 30 so that the protrusions 33 are slidably in contact with groove surfaces of the ball rolling grooves 3 of the guide rail 1. The side seal 30 is formed at a flat portion with inserting bores 34 for small screws n for fixing the side seal 30 together with the end cap 2B to the slider main body 2A. A grease nipple fixing bore 35 is also formed in the side seal 30.

The under seal 21 is mounted according to the following procedure.

First, the side seal 30 is applied to the outer end surface 2c of the end cap 2B by positioning the side seal 30 with respect to the end cap 2B via the positioning and under seal fall-off preventing projections 32. The side seal 30 and the end cap 2B are held at the end surface of the slider main body 2A and, then, are fixed to the slider main body 2A by the small screws n. As a result, a gap is formed between the cutout step portion 27 at the lower end surface of the end cap 2B and the bent piece 31 of the side seal 30 By inserting the step surface portion 25 of the under seal 21 into the gap, the under seal 21 can be mounted in a single attaching operation.

Under a condition wherein the under seal 21 has been attached, the inner edge of the under seal 21 protrudes inwardly from the lower end surface 12 of the slider main body 2A and the lip portion 21L of the inner edge is brought into contact with the side surface 1b of the guide rail 1 while pressing the side surface 1b. Because of the pressing of the under seal 21 against the side surface 1b, the under seal 21 in turn is pressed outwardly. However, the positioning and under seal fall-off preventing projection 32 abuts against the under seal 21 and prohibits the outward displacement of the under seal 21 such that the under seal 21 does not fall off of the slider.

Accordingly, riveting is not necessary and there is no need to form fixing bores in the lower surface 12 of the slider main body 2A. Furthermore, the demounting of the under seal 21 is also carried out in a single operation such that the replacement of the under seal 21 is very easy.

Furthermore, since there is no need to form slittings in the lower surfaces of the end cap 2B for fixing the under seal thereto, manufacturing is easy and the strength of the end caps is not reduced. Thus, reliability can be insured. In addition, since the under seal 21 can be formed to extend over the whole length of the slider 2, including the thickness of the end caps 2B, sealing can be achieved completely, including sealing of the opposite end portions of the slider 2.

In the embodiment described above, although the step surface portions 25 are formed at the opposite ends of the under seal 21 and the cutout step portions 27 are formed in the lower end surface 26 of the end caps 2B, it is possible to form the opposite ends of the under seal 21 and the lower end surface 26 of the end caps 2B in a flat form without having step portions.

Furthermore, in the embodiment described above, although the present invention is applied to a linear guide apparatus having the ball rolling grooves 5 formed in two rows in each side of the guide rail 1 and slider 2, the present invention is also applicable to other types of linear guide apparatuses.

As described in the foregoing, in the present invention, each of a pair of under seals used with the linear guide apparatus is formed in a rectangular strip shape having a length substantially equal to the length of the slider. On the other hand, each of the side seals has a pair of bent pieces formed by bending lower end portions of both leg portions axially inwardly to respectively sandwich one end portion of the under seals between the bent pieces and the end cap. Each under seal has positioning and under seal fall-off preventing projections respectively formed by bending lateral outer side portions of the bent pieces further upwardly at right angles. Thus, each under seal is mounted to the slider by inserting each end portion of the under seal into a gap between the bent piece of the side seal and the lower end surface of the end cap. By virtue of this dust seal structure, the following advantages are provided.

The rivet bore forming work on the slider main body and the subsequent riveting at the time of assembling are not necessary and the mounting and demounting of the under seal can be achieved in a single operation. Thus, the number of processes of working and assembling can be reduced to a great extent.

The sealing can be achieved over the whole length of the slider such that the dust sealing is complete without any non-sealed portion.

The under seals are supported by the rigid side seals and, further, since the end caps are not required to be formed with slittings which reduce the strength of the end caps, the under seals can be securely and reliably mounted.

What is claimed is:

1. A dust seal device for a linear guide apparatus, wherein the linear guide apparatus includes an axially extending guide rail having ball rolling grooves respectively formed in both side surfaces and a slider movably straddling the guide rail, the slider including a slider main body having ball rolling grooves respectively opposing the ball rolling grooves of the guide rail and formed in inner surfaces of side walls thereof, the slider main body further having through bores defining ball return passages formed respectively in the side walls thereof in parallel to the ball rolling grooves of the slider main body, a pair of end caps respectively joined to opposite ends of the slider main body, each of the end caps having a pair of curved paths respectively bringing a corresponding one of the ball return passages into communication with a corresponding one of the ball rolling grooves, and a plurality of balls rollably inserted into the opposing ball rolling grooves, the dust seal device comprising:

a pair of side seals respectively attached to front and rear end surfaces of the end caps, the side seals sealing front and rear gaps formed between the slider and the guide rail; and a pair of under seals for sealing lower gaps formed between the slider and the guide rail;

each of the pair of under seals having a rectangular strip shape of a length substantially equal to the length of the slider;

each of the pair of side seals having a pair of bent pieces formed by bending lower end portions of both leg portions inwardly in the axial direction so that the bent pieces cover lower end surfaces of the side walls of the end cap and sandwich one end of the pair of under seals between the bent pieces and the lower end surfaces of the end cap, each of the pair of side seals further having a pair of positioning and under seal fall-off preventing projections formed by respectively bending outer lateral sides of the pair of bent pieces upwardly;

the pair of under seals being mounted to the slider by inserting each end portion of the under seals into a gap formed between the bent piece of the side seal and the lower end surface of the end cap.

2. The dust seal device according to claim 1 wherein cutout step portions are respectively formed in the lower surfaces of each of the end caps and step surfaces are respectively formed at opposite ends of each of the pair of under seals so that each of the cutout step portions is engaged with a corresponding one of the bent surfaces of the under seals.

* * * * *